Figure 1:
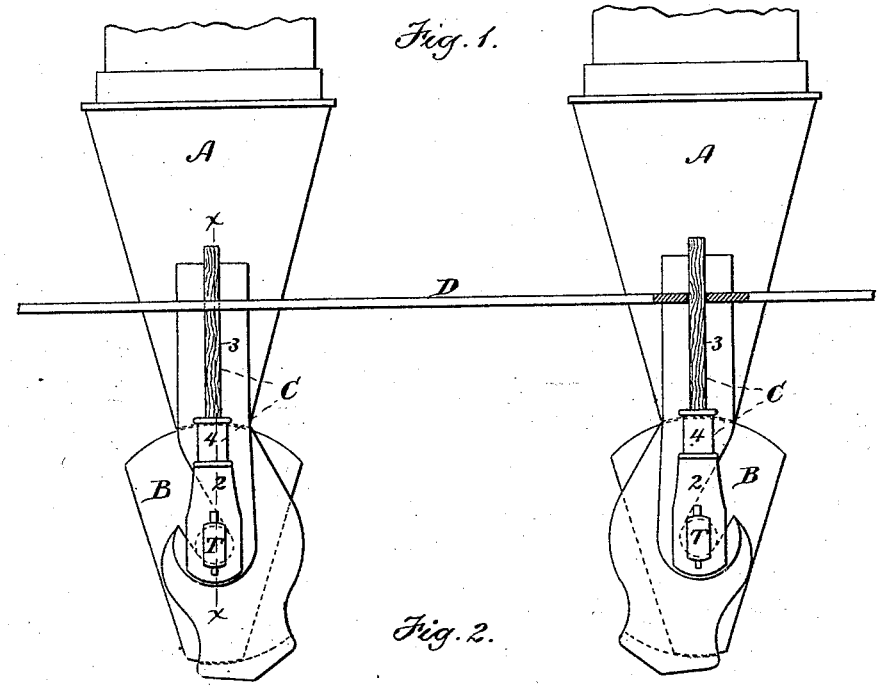

(No Model.)

J. H. WEBSTER.
MEASURING AND DISCHARGING APPARATUS FOR COOLING TUBES OF CHAR FURNACES.

No. 257,114. Patented Apr. 25, 1882.

Witnesses:
C. P. Judd.
A. L. White

Inventor:
John H. Webster
by Wright & Brown
Attys

UNITED STATES PATENT OFFICE.

JOHN H. WEBSTER, OF BOSTON, ASSIGNOR TO HIMSELF AND OSCAR B. STILLMAN, OF BROOKLINE, MASSACHUSETTS.

MEASURING AND DISCHARGING APPARATUS FOR COOLING-TUBES OF CHAR-FURNACES.

SPECIFICATION forming part of Letters Patent No. 257,114, dated April 25, 1882.

Application filed February 28, 1882. (No model.)

*To all whom it may concern:*

Be it known that I, JOHN H. WEBSTER, of Boston, in the county of Suffolk and State of Massachusetts, have invented certain Improvements in Measuring and Discharging Apparatus for Cooling-Tubes of Char-Furnaces, of which the following is a specification.

This invention relates to apparatus for discharging bone-black or animal char as it passes from the furnaces which revivify it after it has been used in the filtration of sugar, and is an improvement on the apparatus for which Letters Patent of the United States were granted to Oscar B. Stillman and myself January 8, 1878, No. 199,118. In said apparatus the heating-tubes of the furnace are provided with cooling-tubes, the lower ends of which are uncovered at intervals to permit the discharge of the char into movable measuring-boxes, reciprocated by automatic mechanism across the mouths of the cooling-tubes, so as to intermittently receive, cut off the flow of, measure, and discharge the char, plates on the upper ends of said boxes acting as gates to permit the flow of the char from the cooling-tubes when the boxes are moved in one direction, and shut off the flow from the tubes and permit the discharge to take place from the boxes when the latter are moved in the opposite direction.

It sometimes happens that the char in the cooling-tubes contains pieces of foreign material—such as scraps of iron or nails—which find their way into the char by accident, and such pieces are liable to be caught by and obstruct the top plate of a measuring-box when said plate is being moved forward through the char to cut off the flow thereof. In such case, if the obstruction is of sufficient strength, it will cause the breakage of the measuring-box or of some part connecting the box with the motor, which oscillates or reciprocates it intermittently.

My invention has for its object to provide such a connection between the measuring-box and the operating mechanism that the breakage caused by the accidental obstruction of any measuring-box will inevitably occur in a part that can be readily and inexpensively replaced; and to this end the invention consists in the provision of an easily attachable and detachable section in the arm which connects each measuring-box with the part of the automatic mechanism which gives it motion, said section being comparatively fragile, so that while it will withstand the strain to which it is ordinarily subjected it will break under such additional strain as would be caused by the obstruction of the measuring-box in the manner above described, so that the box and other more expensive and less easily replaced parts dependent on said section for motion will simply be made inoperative without sustaining injury, all of which I will now proceed to describe and claim.

Figure 2:
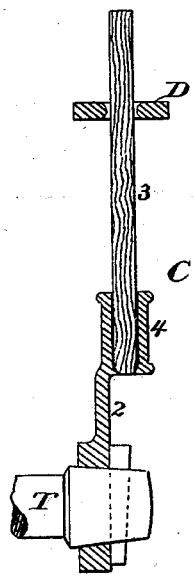
Figure 3:
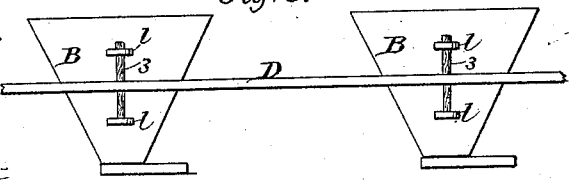

Of the accompanying drawings, forming a part of this specification, Figure 1 represents a side elevation of a portion of a bone-black or char-burning furnace embodying my improvement. Fig. 2 represents a section on line $x\ x$, Fig. 1. Fig. 3 represents a modification.

The same letters of reference indicate like parts in all the figures.

I will first describe Figs. 1 and 2 of the drawings, in which A A represent the lower ends of two cooling-tubes. B B represent the measuring-boxes, pivoted on centers, and provided with automatic mechanism, whereby they are vibrated intermittently, as shown in Fig. 1 of the above-named patent, to which reference is made for a fuller description of the construction and operation of said boxes.

One of the trunnions T of each measuring-box is provided with an arm, C, which constitutes the only connection between the box and a bar, D, which is intermittently reciprocated by the automatic mechanism described in the above-named patent, the reciprocating movements of said bar being caused to oscillate the boxes B through the arms C.

In carrying out my invention I prefer to make each arm C in two parts, 2 and 3. The part 2 is of substantial construction, preferably a metal casting, and is attached to one of the trunnions T of the measuring-box, and is provided at its outer end with a socket, 4. The part 3 is of comparatively fragile nature, being preferably a piece of ordinary wood doweling inserted in the socket 4, and projecting into an orifice in the bar D or otherwise engaged with the latter. The part or section 3 is of sufficient strength to oscillate the measuring-box when there is no obstruction in the char in the cooling-tube; but when the top plate of the measuring-box, in moving forward to shut off the flow, meets an obstruction sufficiently strong to stop the box, the section 3, being the weakest intermediate part, will give way, and thus disconnect the box from the automatic driving mechanism, and prevent the box from being injured.

It is obvious that the provision of the socket on the part 2 enables the section 3 to be very readily applied and removed, while the inexpensive nature of the section 3, particularly when it is made of wood, renders its breakage a matter of but little moment. I do not limit myself, however, to the described construction of the arm C, although it is the best of which I am at present aware. Said arm may be of metal or any suitable material adapted to be readily applied to and removed from the trunnion of its measuring-box.

If desired, the arm C may be made sufficiently fragile, when made of metal, by perforating it at the point where breakage is to occur.

Fig. 3 shows the adaptation of my improvement to measuring-boxes which are reciprocated in a rectilinear direction, instead of being oscillated. In this modification the boxes are provided with socketed lugs $l\ l$, in which are inserted the arms 3, made of wood or otherwise rendered sufficiently fragile, said arms being engaged with the reciprocating bar D, as in the first instance.

It will be observed that the provision of the fragile devices, as described, connecting a series of measuring-boxes with operating mechanism common to all the boxes, prevents the obstruction of one box from interfering with or stopping the operation of the others of the same series, each box when obstructed being disconnected from the others without interfering with their operation.

I claim—

1. The combination, with a movable measuring-box at the mouth of a cooling-tube, and mechanism for intermittently oscillating or reciprocating said box, of an intermediate connecting arm or device of comparatively fragile construction, substantially as and for the purpose set forth.

2. The combination, with a pivoted measuring-box at the mouth of a cooling-tube, and mechanism for intermittently oscillating said box, of the intermediate connecting-arm composed of the socketed part 2, attached to the trunnion of the box, and the fragile section 3, loosely inserted in the socket of the part 2, as set forth.

3. The combination, with a series of movable measuring-boxes, and mechanism common to all the boxes of the series for intermittently oscillating or reciprocating said boxes, of intermediate arms or devices of fragile construction connecting the boxes with the operating mechanism, whereby when any box is accidentally obstructed the connection between such box and the others of the series is broken without interfering with the operation of the other boxes, as set forth.

In testimony whereof I have signed my name to this specification, in the presence of two subscribing witnesses, this 23d day of February, A. D. 1882.

JOHN H. WEBSTER.

Witnesses:
C. F. BROWN,
A. L. WHITE.